T. B. POWERS.
WEIGHING SCALE.
APPLICATION FILED MAY 2, 1916.
1,233,124.
Patented July 10, 1917.
2 SHEETS—SHEET 1.
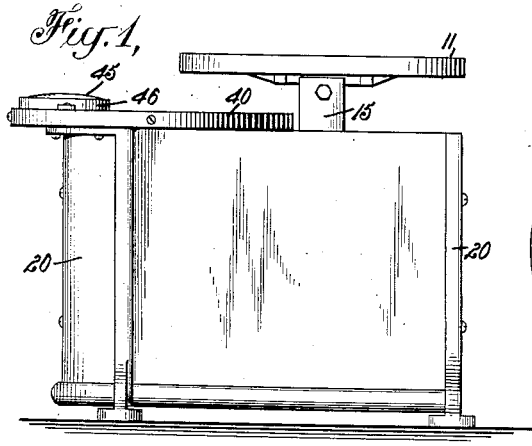
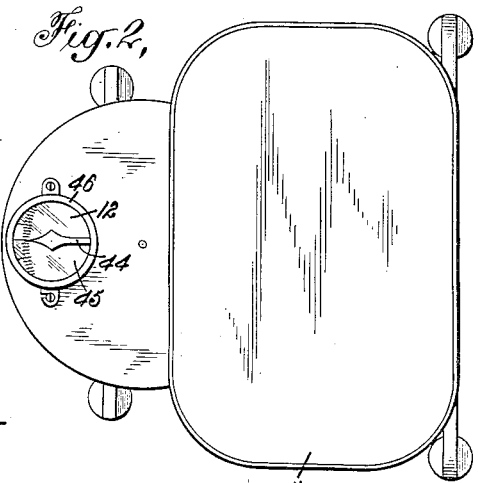
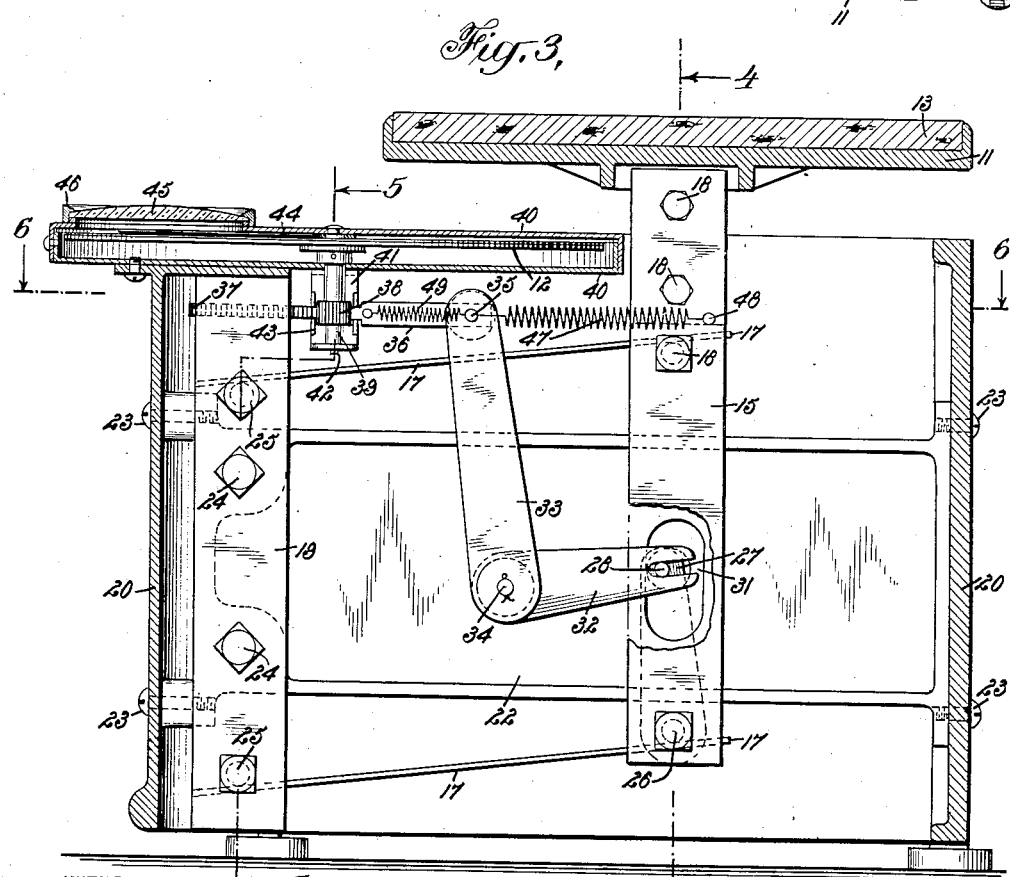
WITNESSES
INVENTOR
Timothy B. Powers
BY
ATTORNEYS T. B. POWERS.
WEIGHING SCALE.
APPLICATION FILED MAY 2, 1916.
1,233,124.
Patented July 10, 1917.
2 SHEETS—SHEET 2.
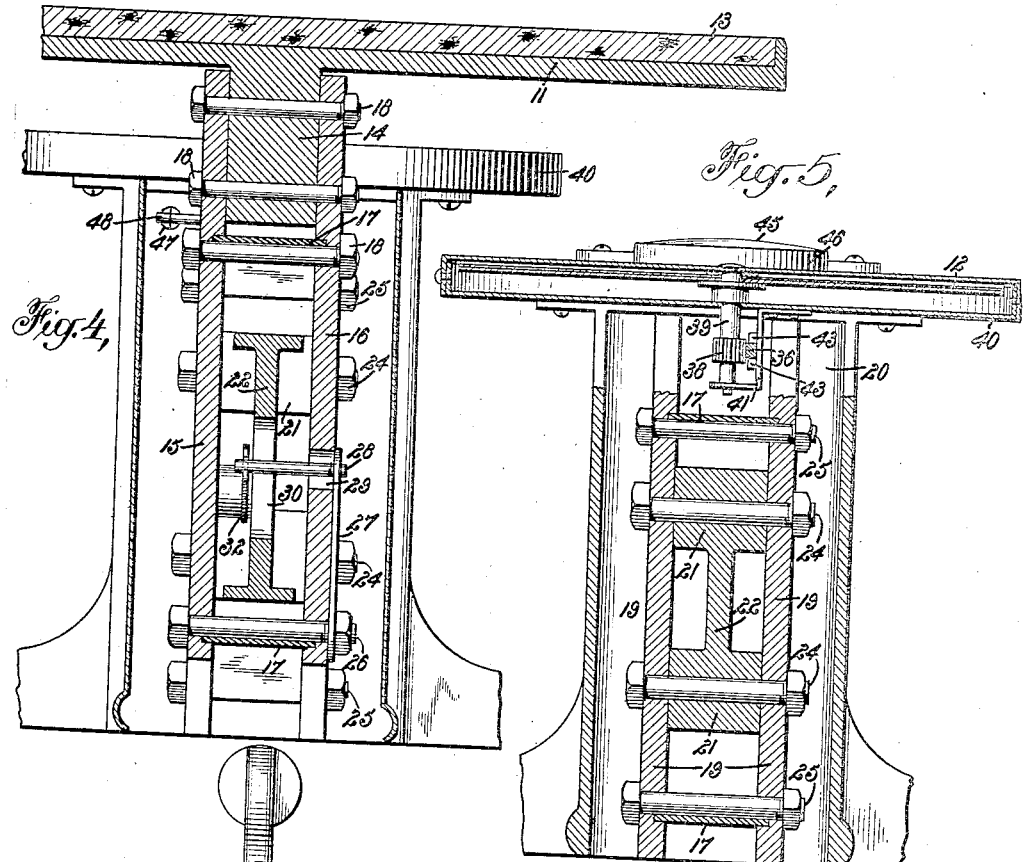
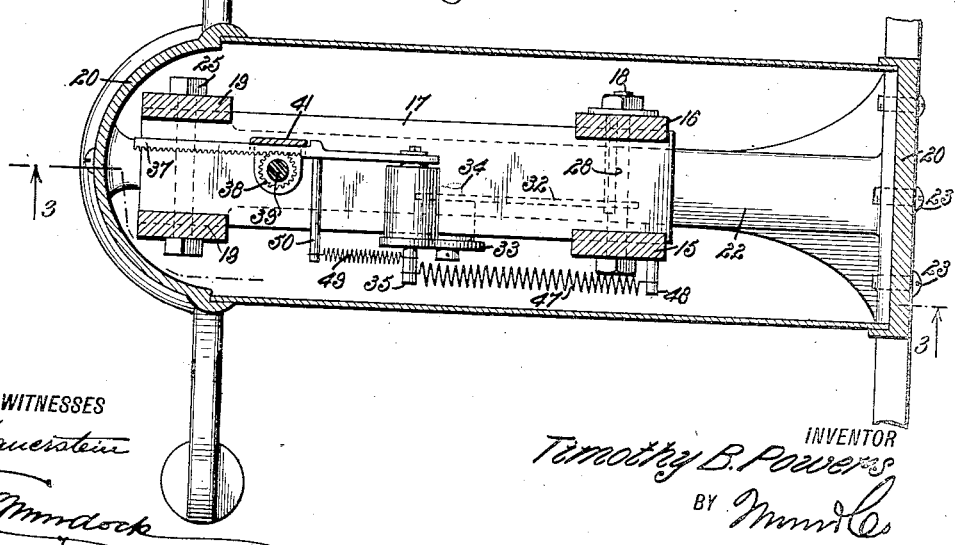
WITNESSES
INVENTOR
Timothy B. Powers
BY
ATTORNEYS

UNITED STATES PATENT OFFICE.

TIMOTHY B. POWERS, OF NEW YORK, N. Y., ASSIGNOR TO THE JACOBS BROS. CO., INC., OF NEW YORK, N. Y., A CORPORATION OF NEW YORK.

WEIGHING-SCALE.

1,233,124.  Specification of Letters Patent.  Patented July 10, 1917.

Application filed May 2, 1916. Serial No. 94,873.

*To all whom it may concern:*

Be it known that I, TIMOTHY B. POWERS, a citizen of the United States, and a resident of the city of New York, borough of Manhattan, in the county and State of New York, have invented a new and Improved Weighing-Scales, of which the following is a full, clear, and exact description.

Among the principal objects which the present invention has in view are: to simplify the supporting structure for the platform of a scales constructed and arranged in accordance with the present invention; to provide an adjustment for the device employed for recording the depression of the platform; and to simplify and reduce the cost of the construction of an apparatus of the character mentioned.

Drawings.

Figure 1 is a side elevation of a scales constructed and arranged in accordance with the present invention;

Fig. 2 is a top plan view thereof;

Fig. 3 is a vertical section on an enlarged scale, said section being taken as on the line 3—3 in Fig. 6;

Fig. 4 is a vertical cross section, the section being taken as on the line 4—4 in Fig. 3, portions of the platform, dial and scale-supporting members being omitted;

Fig. 5 is a cross section taken as on the line 5—5 in Fig. 3;

Fig. 6 is a horizontal section taken as on the line 6—6 in Fig. 3.

Description.

The apparatus shown in the accompanying drawings belongs to the class of weighing scales usually forming part of the furniture of a bathroom. As usually employed, the bather stands on the platform 11, and while so standing, reads by the scale on the card 12, his or her weight.

The apparatus affords also a convenient stool or seat, the structure being sufficiently firm to support a person when dressing.

The platform 11 has upturned perimeter flanges forming a seat for a mat 13. The mat 13 is preferably constructed of cork. This may, however, be varied to suit the design of the manufacturer or the desire of the purchaser. As shown best in Fig. 4 of the drawings, the platform 11 has a central post 14, to which is securely bolted, side plates 15 and 16. The plates 15 and 16 are provided with oppositely-disposed grooves formed in their inner surfaces, to receive two spring blades 17. The blades 17 are disposed one adjacent the upper ends of the plates 15 and 16, the other adjacent the lower ends of said plates. The plates 15 and 16 are clamped rigidly on the post 14, and upon the blades 17, by screw bolts 18. The slots wherein the ends of the blades 17 rest, are disposed at an angle to the vertical axes of the plates 15 and 16, as best shown in Fig. 3 of the drawings. The anchor plates 19, adjacent the end of the containing frame 20, are similarly grooved to receive the fixed ends of the blades 17. When the blades 17 are thus held between the plates 15, 16 and 19, the platform 11 and parts connected therewith are held normally in the elevated position best shown in Fig. 3 of the drawings.

The plates 19 are held in spaced relation by a framing casting 21. The casting 21 has a central fin 22, which, as shown best in Fig. 4 of the drawings, passes freely between the plates 15 and 16, and is secured at opposite ends of the casing 20, by fastening screws 23.

When assembling the scales, the casting 21 and anchor plates 19 are primarily bolted together, employing for that purpose, the bolts 24. Before tightening the bolts 24, the blades 17 are inserted in the slots provided therefor in the plates 17, to be there held by the clamp bolts 25. The plates 15 and 16 having been previously secured to the post 14 of the platform 11, are then adjusted in active position, the slots provided in said plates to receive the blades being adjusted to the said blades, and the whole clamped into rigid engagement by the bolts 18 and 26.

The bolt 26 is further provided to receive an adjusting lever 27. The lever 27 has a pin 28 laterally extended therefrom through orifices 29 and 30 formed in the plate 16 and fin 22, respectively. The alinement of these orifices and the pin 28 is best shown in Fig. 4 of the drawings. The end of the pin 28, as seen best in Fig. 3 of the drawings, rests in a slot 31 in the short arm 32 of a bell crank lever 33. The lever 33 is pivotally mounted by a pin 34 on the fin 22, and is pivotally connected at the free end by a pin 35, with a bar 36, the forward end whereof has rack teeth 37. The rack teeth 37 engage the pinion 38, which is mounted on a shaft 39, which extends from the housing 40, wherein is contained the card 12. Further, the card 12 is rigidly secured on the shaft 39.

To hold the shaft 39 in operative relation to the rack 37, a bracket 41 is provided, the lower end whereof is pierced to receive the pinion 42 at the end of the shaft 39. Extended from the sides of the bracket 41, are guides 43 for the rack teeth 37. This construction is best shown in Fig. 3 of the drawings.

The card 12 is rotated in correspondence with the rotation of the shaft 39, whenever the lever 33 and the lever 27 with which it is connected are depressed. A pointer 44 is mounted on the top of the housing 40, having a frictional connection therewith so that it may be shifted to meet any discrepancy or variation to which the card 12 may be subject, but which when not manually shifted, remains immovable, the calibrated edge of the card 12 swinging thereunder.

The card 12 and the calibrations thereon are read by means of the glass 45. The glass 45 is held in service position by a screw ring 46. The lever 33 is normally retracted by a spring 47, which is anchored by a pin 48 on the plate 15. To hold the bar 36 in operative position on the pin 35, is the office of a light retracting spring 49, which connects the pin 35 and the pin 50.

Operation.

When a weight is placed on the platform 11, the spring blades 17 yield to lower the plates 15 and 16 and the arm 27. The arm 27, by means of the pin 28, rocks the lever 33, the free end thereof being retracted to move the rack bar 36 and rotate the pinion 38 connected with the teeth 37 of said rack bar. The card 12 is thus revolved in proportion to the depression of the platform 11. As the card passes under the pointer 44, the markings are noted and ascertained in comparison with the weight supported on the platform 11. When the card is properly calibrated, the glass 45 serves to magnify the marking, so that the person standing upright on the platform 11, may read the calibrations on the card 12.

If in the operation of the scales, due to the variation in resiliency of the springs 17, or other cause, it be found that the calibrations on the card 12 do not register properly with the pointer 44, the screw 26 is loosened and the arm 27 is rocked thereon to increase or diminish the leverage of the pin 28 on the arm 32. This adjustment increases or diminishes the proportionate movement of the card 12, to correspond with the movement of the plates 15 and 16 and the platform 11 supported thereby.

If it be found that the card 12 is out of adjustment with the pointer 44, due to weakness or depression in the springs 17, or for other cause, this may be remedied by removing the glass 45 and by manually shifting the pointer 44 to register with the zero mark on the card 12.

Claims.

1. A weighing scales comprising a platform; a plurality of leaf springs for supporting said platform; a plurality of supporting plates, said plates being arranged in pairs, said pairs having parallel grooves in the juxtaposed faces thereof for receiving the ends of said springs; and a casing for said springs and plates connected therewith, said casing supporting in fixed relation one pair of said plates.

2. A weighing scales comprising a platform; plates supporting said platform; a register disposed adjacent said platform and embodying a rotary member and a calibrated scale; and mechanism operatively connecting the plates supporting said platform and said rotary member, said mechanism embodying a lever and a movable connection for varying the movement of said lever.

3. A weighing scales comprising a platform; plates supporting said platform; a register disposed adjacent said platform and embodying a rotary member and a calibrated scale; and mechanism operatively connecting the plates supporting said platform and said rotary member, embodying a bell crank lever, a rack bar operatively connected with one end of said bell crank lever, an adjustable connection between the plates supporting said platform and said lever for varying the throw of said lever, a gear-toothed pinion connected to rotate with said rotary member, and means adjustably connecting said lever and said plates for varying the movement of said lever and rack bar connected therewith.

4. A weighing scales comprising a casing embodying a central fin and end pieces rigidly connected therewith; a pair of supporting plates rigidly mounted on said fin, said plates having grooves in opposite faces thereof, said grooves being disposed above and below said fin; a plurality of leaf springs mounted in said grooves; means for rigidly clamping said plates on said springs; a platform; and a second pair of supporting plates for said platform, said plates being disposed at opposite sides of said fin and provided with grooves in the opposed faces thereof, said grooves corresponding with the grooves in said first-mentioned pair.

5. A weighing scales comprising a casing embodying a central fin and end pieces rigidly connected therewith; a pair of supporting plates rigidly mounted on said fin, said plates having grooves in opposite faces thereof, said grooves being disposed above and below said fin; a plurality of leaf springs mounted in said grooves; means for rigidly clamping said plates on said springs; a platform; a second pair of supporting plates for said platform, said plates being disposed at opposed sides of said fin and provided with grooves in the opposed faces thereof, said grooves corresponding with the grooves in said first-mentioned pair of plates; a register having a rotary member for recording the depression of said platform; and a translation mechanism operatively connecting said register and said plates connected with said platform, said mechanism embodying a bell crank lever pivotally mounted on said fin, one arm of said lever being arranged to move to and from said register, and the other arm of said lever being operatively connected with said plates directly connected with said platform.

6. A weighing scales comprising a casing embodying a central fin and end pieces rigidly connected therewith; a pair of supporting plates rigidly mounted on said fin, said plates having grooves in opposite faces thereof, said grooves being disposed above and below said fin; a plurality of leaf springs mounted in said grooves; means for rigidly clamping said plates on said springs; a platform; a second pair of supporting plates for said platform, said plates being disposed at opposite sides of said fin and provided with grooves in the opposed faces thereof, said grooves corresponding with the grooves in said first-mentioned pair of plates; a register having a rotary member for recording the depression of said platform; a translation mechanism operatively connecting said register and said plates connected with said platform, said mechanism embodying a bell crank lever mounted on said fin, one arm of said lever being arranged to move to and from said register, and the other arm of said lever being operatively connected with said plates directly connected with said platform; and an intermediate arm operatively connecting said plates and said lever, said arm being adjustable to vary its connection with said lever to vary the movement of said lever.

TIMOTHY B. POWERS.